United States Patent [19]

Griffin

[11] Patent Number: 4,920,791

[45] Date of Patent: May 1, 1990

[54] WIND TUNNEL MODEL SUPPORT AND ATTITUDE CONTROL

[75] Inventor: Stanley A. Griffin, La Jolla, Calif.

[73] Assignee: General Dynamics Corporation, Convair Division, San Diego, Calif.

[21] Appl. No.: 257,609

[22] Filed: Oct. 14, 1988

[51] Int. Cl.$^5$ ............................................. G01M 9/00
[52] U.S. Cl. ..................................................... 73/147
[58] Field of Search ................................. 73/147, 148

[56] References Cited

U.S. PATENT DOCUMENTS

| | | | |
|---|---|---|---|
| 3,276,251 | 10/1966 | Reed III | 73/147 |
| 3,695,101 | 10/1972 | Hanson | 73/147 |
| 4,116,056 | 9/1978 | Bulychev et al. | 73/147 |
| 4,658,635 | 4/1987 | Pszolla et al. | 73/147 |

FOREIGN PATENT DOCUMENTS

| | | | |
|---|---|---|---|
| 1172875 | 6/1964 | Fed. Rep. of Germany | 73/147 |
| 0174924 | 9/1985 | Japan | 73/147 |

*Primary Examiner*—Joseph A. Orsino
*Assistant Examiner*—Brent A. Swarthout
*Attorney, Agent, or Firm*—John R. Duncan; Frank D. Gilliam

[57] ABSTRACT

The invention is directed to a model support system for wind tunnel testing. The two embodiments of the model support use a conventual 2-shell strain gauge balance in conjunction with aerodynamically shaped support vanes with one attached to each end of the inner rod (non-metric) of balance with one half below and the other half above the balance.

10 Claims, 2 Drawing Sheets

WIND TUNNEL MODEL SUPPORT AND ATTITUDE CONTROL

BACKGROUND OF THE INVENTION

This invention relates to improvements in devices for measuring the component forces and moments acting on wind tunnel test models and the like, and more particulary on the support for the model during testing.

U.S. Pat. Nos. 2,768,526; 2,785,569 and 3,019,643 generally teach the conventional state of the art support means for model testing in a wind tunnel.

Generally stated the state of the art teaches a supporting rod or cantilever which is attached to a strain gauge balance at the down wind thereof in a generally horizontal position projecting directly upstream in the wind tunnel. The rod is attached to a mounting base supported by a hub carried by radial vanes or struts spaced apart to permit the passage of air therebetween. Strings are attached to the front of the model to provide attitude changes during testing. Either of the above referenced United States Patents teach a similar mounting for the model being tested.

The state of the art positioning means for supporting models in wind tunnel testing provides suitable test results; However, due to the affect of the wind flow on the supporting device and the resulting test errors it would be highly desirable to improve the model support means to further reduce the test result errors due to the affect of the support.

The model support means of the present invention reduces test errors attributed to the state of the art model mounting means.

SUMMARY OF THE INVENTION

The present invention is directed to a new concept in wind tunnel model testing. The new concept virtually removes any affect on the test results due to wind flow over the model support or mounting means and changing the attitude of the model during testing is easily facilitated. There are two embodiments of the invention shown. In both embodiments both ends of the balance are supported by four aerodynamically designed vanes (aerovanes) which are attach at one end to the outer body shell of a balance having an inner and outer body shell. Two aerovanes extend both below and above from each balance end attachment. The other ends of the aerovanes are rotatably attach to one side of a load cell through rotatable pin joints to eliminate fixation or a bending moment in the vane. The other end of the load cells are attached to a tension device such as, a servo operated reel or the like fixed attached in place. When a change in aerovane load is sensed by the load cell the tension means is operated to counteract the load changes, e.g. if slack or loss of normally expected tension is detected by the load cell the tension device will operate to remove the slack and restore the normal desired tension in the aerovanes or if the model attitude requires changing all of the tension means will operate to provide effective increase or shortening in aerovane length whereby the position of the model under test will be repositioned.

In the first preferred embodiment the aerovanes pass through spaced apart apertures in the outer circumference of two large opposed rings one of which is positioned on each side of the wind tunnel test area parallel with the direction with the flow of test wind. The distal ends of the aerovanes on the inside of the wheel adjacent to the wind tunnel walls are attached to load cells and tension means as discussed above and are located out of the wind flow area. Each ring supports two upper and two lower extending aerovanes, e.g. one upper and lower extending aerovane are attached to each end of the balance outer shell. By rotating the wheels the attitude of the model can be changed during testing without changing aerovane lengths.

In the second preferred embodiment, the same aerovane system is utilized as in the first preferred embodiment, the only change is that the rings are replaced with a pair of opposed pivotal balance beams to which the aerovanes are attached in a similar manner. In the second preferred embodiment, the pivotal balance beams are located out side of the test area of the wind tunnel and the aerovanes extend through the wall of the wind tunnel. The same load cells and tension means are used to maintain aerovane tension. To change the attitude of the model in this embodiment the balance beams are rotated together clockwise or counterclockwise until the model attitude is properly positioned.

The aerovanes pass through apertures in the model adjacent to their model attachment. These apertures are sealed to air flow around the aerovanes by a resilient sealing material such as, silicone or the like so that little changes in the direction of the aerovane from the balance attachment will not affect the model's position. It should be understood that with the aerovanes of the above described embodiments of the model suspension system there is generally no change in the direction of the aerovane at any change in model attitude so only minimal changes would ever be anticipated.

It is an object of this invention to provide a model suspension system for a wind tunnel testing which has minimal or no affect on the outcome of the test.

It is another object of this invention to provide support lines for the model support system that are aerodynamic in cross section.

It is still another object of this invention to provide a connection between the aerovanes and the load cell which is freely pivotable.

Still another object of this invention is to provide a pair of opposing rings for attaching the model support system whereby attitude changes to the model can be accomplished by turning the rings together.

Yet another object of this invention is to more accurately measure six components of forces and moments on the model.

These and other features, objects and advantages of the invention will become more fully evident from the following description thereof by reference to the accompanying drawing Figures.

BRIEF DESCRIPTION OF THE DRAWING FIGURES

DESCRIPTION OF A FIRST EMBODIMENT

Figure 1:
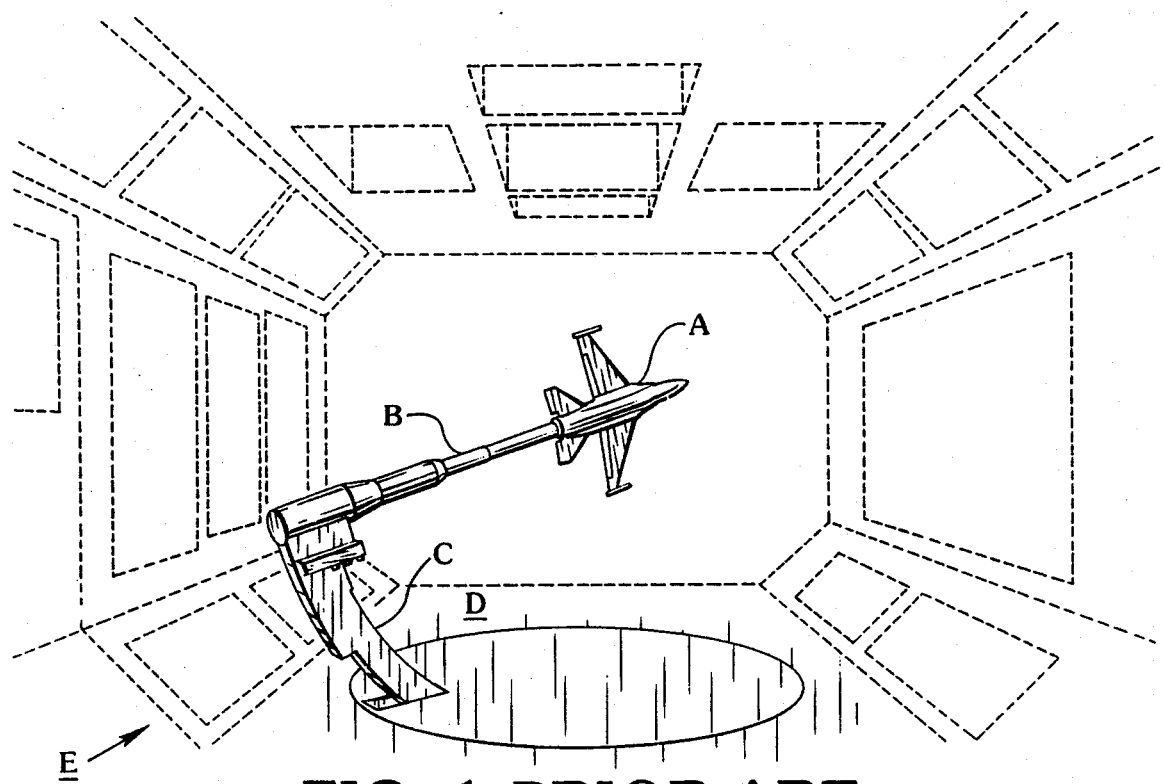
FIG. 1 is a showing of a typical prior art wind tunnel model support method.

Referring now to the prior art showing depicted in FIG. 1, a model A is shown supported in an elevated position by means of a rod B connected to a balance at one end (not shown) and to an upright support C extending from the floor D of a wind tunnel E. As can been seen in the drawing, the rod B and the support C will affect the wind flow through the tunnel and its affect on the model. Even though the errors produced can be somewhat eliminated by mathematical means the less affect of wind flow by model support mechanisms the more accurate the actual raw test data will be.

Figures 2, 3:
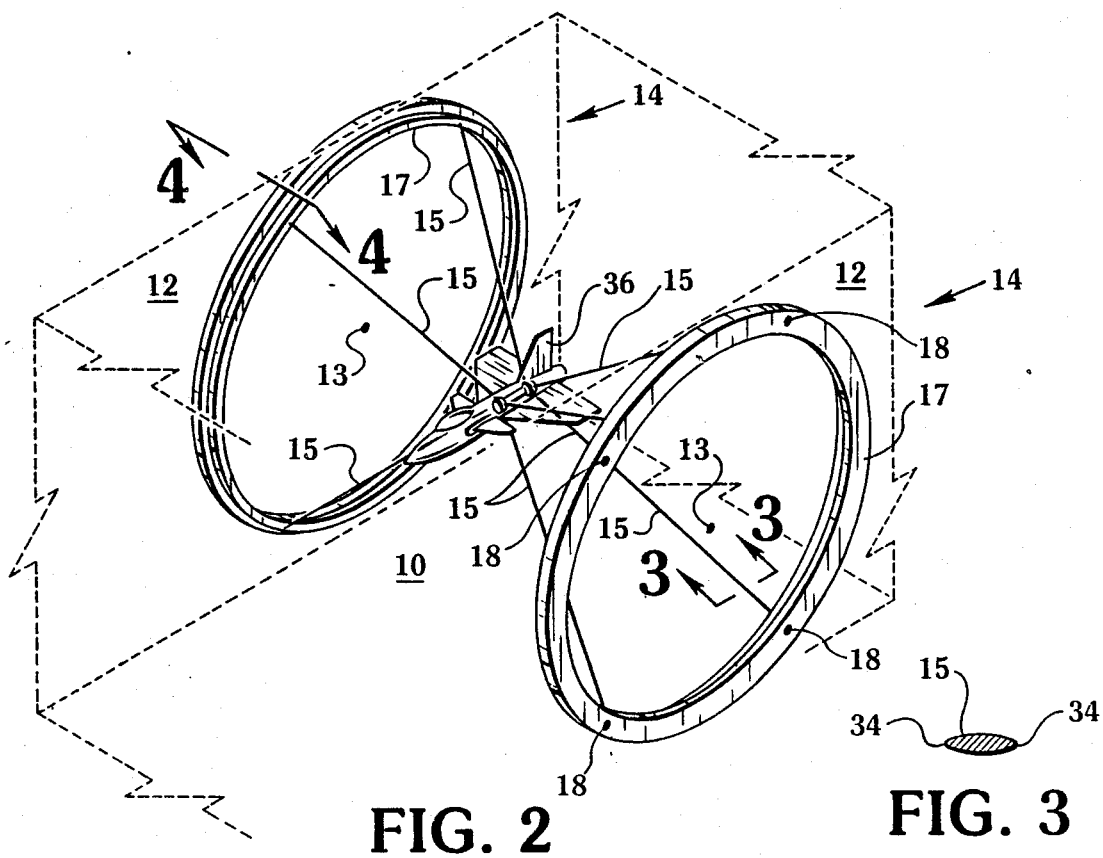
FIG. 2 is a showing partial in phantom of the model support in one embodiment of the invention.
FIG. 3 is a showing taken along line 3—3 of FIG. 3 showing the cross-section of an areovane.
Figure 4:
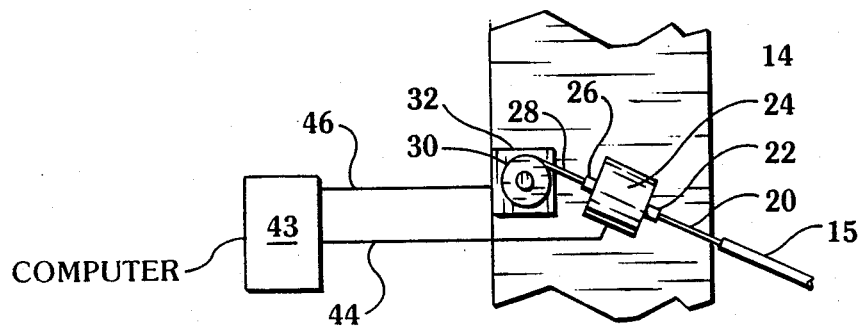
FIG. 4 is a showing of FIG. 2 taken along line 4 —4 of FIG. 3.

Referring now specifically to FIGS. 2-4 which depict one of the embodiments of the invention. The test area of a wind tunnel 10 is shown. Along each side wall 12 is positioned a large ring like support 14. The rings are free to rotate either clockwise or counterclockwise about their center 13. During rotation, the rings 14 are rotated simultaneously to prevent any angle changes to the aerovanes 15 at their balance 16 attachment end hereinafter described in more detail. Along the circumferential rim 17 of the rings 14 four apertures 18 are located through the width of the ring perpendicular to the diameter of the ring. Two of the apertures 18 are generally located in spaced apart pairs on the upper and lower portions of the circumference 17 of the ring. Through these apertures a swivel pin 20 (see FIG. 4) attaches the end 22 to a load cell 24. The swivel pin 20 allows relative rotation between the aerovane 15 and the load cell 24. The other end 26 of the load cell is connected to a cable 28 attached to the axle or reel 30 of a take-up mechanism 32, as for example, a servo motor operated take-up reel which rotates when the servo motor is operated to either release or takes up tension in the aerovanes 15 relative to the balance. The aerovanes 15 are shaped for the least affect on the flow of wind through the tunnel 10. A typical cross-section of an aerovane is shown in FIG. 3 by way of an example and not by way of limitation. In this embodiment of the aerovane the points or tips 34 face the upstream and downstream direction of wind flow, i.e. the wind striking the leading edge 34 of the aerovane is bisected thereby producing little or no affect on the flow around the model 36 in which a balance 38 is positioned. The aerovanes are attached to both ends of the balance 38 as shown in the various drawing Figures. The location of the balance 38 within the model being tested is conventionally located in the gravitational center of the model 36 (see specifically FIG. 5). Typical balances are taught in the above reference United States Patents and in U.S. Pat. No. 3,878,713. This invention is not directed to either the location of or the specific details of the balance 38.

Figure 5:
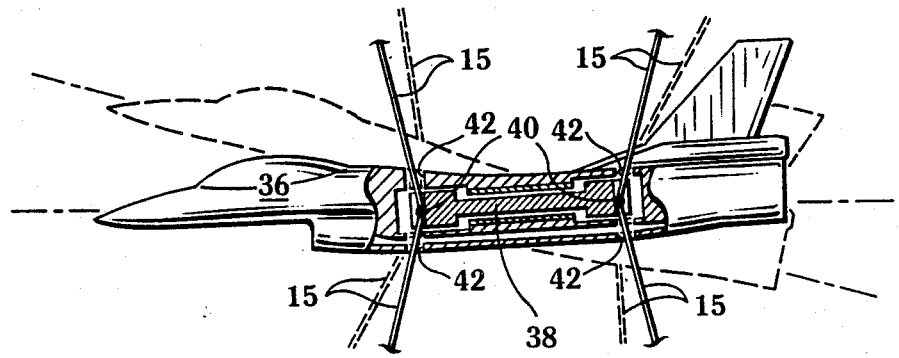
FIG. 5 is a partial cutaway showing of a model under test showing the aerovane attachment and location relationships.

As can be seen in drawing FIG. 2, the balance and model supported by the support system of this invention can have its attitude position changed as shown in phantom in drawing FIG. 5 by rotating the rings 14 simultaneously in a clockwise manner.

Referring now specifically to drawing FIG. 5, The aerovanes 15 are connected to the balance at attachment points 40 by any convenient means such as, by way of example and not by way of limitation, hook and eye means. It should be noted that there is no sting support connection to the rear end of the balance as taught by the prior art. Each aerovane 15 passes through an aperture 42 through the side of the model. As can be seen by comparing the angle which the aerovane leaving the balance in the solid and phantom showings of the attitude of the model in FIG. 5, the angles are slightly different from a level positioning of the model and the model is in a steeper attitude position. It is undesirable to leave these apertures 42 open to the wind flow during testing of the model. To prevent wind from entering the apertures 42 during test, the apertures are filled around the aerovane with a highly flexible material, by way of example silicone sealer or the like; However any suitable material which satisfies the intent will be acceptable to practice the invention.

The aerovane tautness and positioning system which comprises the load cells and the take up system operates in the following manner. The tautness of the vanes is preset at a desirable tautness prior to a test sequence by rotation of the take-up reel. The load on each of the load cells is then referenced in a computer 43, for example, and during test if this predetermined tautness is changed the load cell will transmit that change through a communication line 44 to computer 43 which in turn will communicate to servo 32 through communication line 46 operating the reel 30 replacing the preset tautness to the aerovane.

Referring now specifically to drawing FIG. 4, in this Figure the mechanism for maintaining the aerovanes taut is confined within the width of the ring 14. This is shown as an example of one location of the positioning of the tautness mechanism and is not intended to be a limitation for the location placement thereof.

DESCRIPTION OF A SECOND EMBODIMENT

Figure 6:
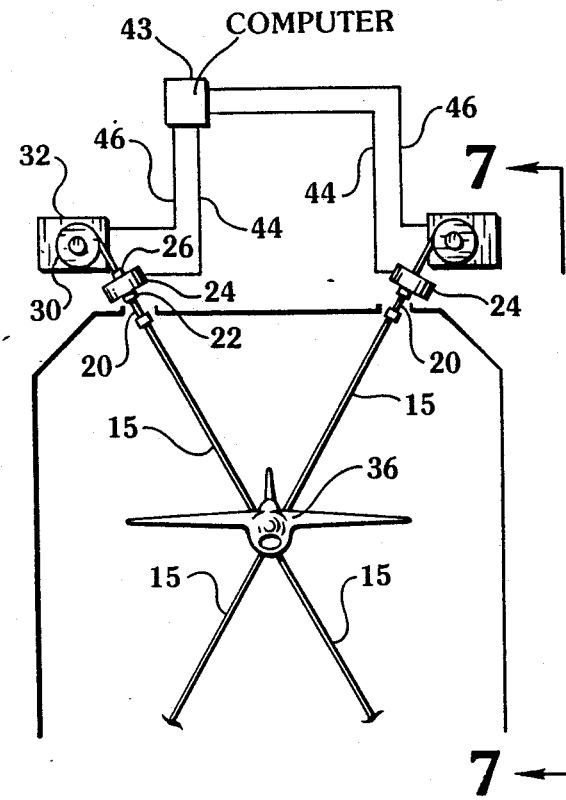
FIG. 6 is an aft schematic showing of a second embodiment of the invention.
Figure 7:
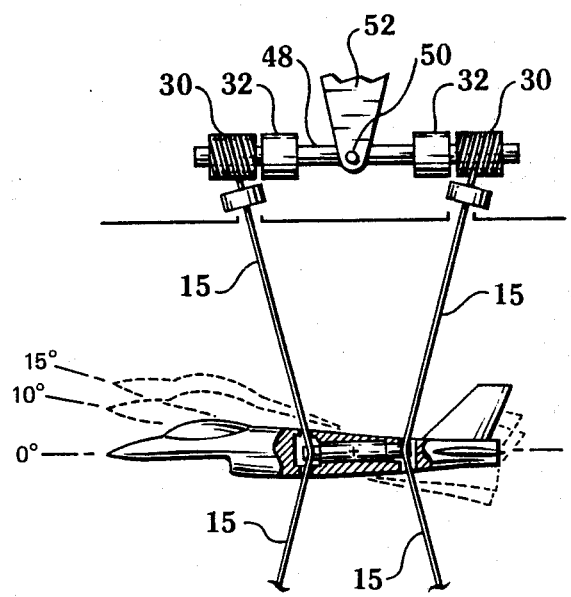
FIG. 7 is a side showing taken along line 7—7 of FIG. 6.

Referring now specifically to drawing FIGS. 6 and 7 wherein a second embodiment of the invention is depicted.

In this embodiment the theory of the device of the invention is the same as the prior described embodiment. The difference in this embodiment is the apparatus for supporting the aerovanes 15 and their attached tautness mechanism. Instead of a ring 14 as shown and described above, a pair of balance beams 48 supported at pivot point 50 by fixed inplace support member 52 above and below the model. The upper and lower pairs of balance beams are positioned on each side of the wind tunnel as are the rings 14 so that when all four are direction rotated together the model supported by the aerovanes 15 will have a change of horizontal attitude change (see the phantom showing of the model in FIG. 7). It should be understood that the beam and the tautness mechanism and the attachment of the load cells to the aerovanes on the lower portion of FIGS. 6 and 7 are exactly as shown at the top of the Figures.

It should be understood that the positioning apparatus of the invention can be employed in any type of wind tunnel where it is found to be suitable for the purpose intended.

It is to be understood that certain changes, alterations, modifications and substitutions can be made without departing from the spirit and scope of the appended claims.

What is claimed is:

1. An improved system for positioning a model and a balance contained therein in a wind tunnel for flow testing comprising:

a plurality of aerovane means connected to the ends of said balance;

a plurality of adjustment means equal in number to the number of said aerovanes, said adjustment means having a rotatable and a fixed position, said rotatable portion being attached to the ends of each of said aerovanes for maintaining a preselected tautness to said aerovanes whereby said model is maintained in a preselected location within said wind tunnel; and positional attachment means to which each of said fixed portions of said adjustment means are fixedly attached.

2. The invention as defined in claim 1 wherein the plurality of said aerovanes equals at least four, two of which extend through the left side of said model and two of which extend through the right side of said model.

3. The invention as defined in claim 2 wherein two of the upward extending aerovanes and two of the downwardly extending aerovanes attached to said positional attachment means in a spaced apart relationship.

4. The invention as defined in claim 1 wherein said positional attachment means comprise an attachment member positioned on each side of said wind tunnel.

5. The invention as defined in claim 2 wherein said positional attachment means comprises an attachment member positioned on each side of said wind tunnel.

6. The invention as defined in claim 4 wherein said attachment member is a large ring.

7. The invention as defined in claim 5 wherein said attachment member is a large ring.

8. The invention as defined in claim 4 wherein said attachment member is a pivotable beam.

9. The invention as defined in claim 5 wherein said attachment member is a pivotable beam.

10. The invention as defined in claim 1 wherein said adjustment means comprise load cells in series between the ends of each of said aerovanes and said rotatable portion of each of said adjustment means, said rotatable portion automatically changes the tautness on said aerovanes as determined by changing loads on said load cell.

* * * * *